3,085,079
METHOD OF PREPARING AN AIR-DRYING CONJUGATED SOYBEAN VINYL ETHER AND ISOBUTYL VINYL ETHER COPOLYMER

Gus C. Mustakas, Peoria, Ill., assignor to the United States of America as represented by the Secretary of Agriculture
No Drawing. Filed Sept. 7, 1960, Ser. No. 54,551
2 Claims. (Cl. 260—33.6)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a modified method of copolymerizing conjugated soybean vinyl ether with a lower alkyl vinyl ether so as to produce copolymers, films of which have air-drying properties and excellent chemical resistance.

Teeter et al., Paint Industry Magazine, 74: 13–17: 1959, have shown that copolymers produced by the flash polymerization of conjugated soybean vinyl ether and a lower alkyl vinyl ether in the presence of stannic chloride catalyst have low molecular weights and viscosities and that these copolymers yield tacky films which do not air-dry.

Although the copolymers produced by the flash polymerization of unconjugated soybean vinyl ether monomer and a lower alkyl vinyl ether have high molecular weights and viscosities and give rise to air-drying films having excellent coating properties, the unconjugated linseed or soybean vinyl ethers are much more difficult and expensive to produce than the easily prepared conjugated isomers prepared by the action of acetylene at atmospheric pressure on vegetable oil derived fatty alcohols, and it would be advantageous to be able to prepare equivalent copolymers using the conjugated soybean vinyl ether.

Accordingly, the principal object of the invention is a method for copolymerizing the less expensive conjugated polyunsaturated soybean vinyl ether and a lower alkyl vinyl ether under carefully controlled critical conditions so as to produce copolymers with molecular weights of about 5,000–10,000, which copolymers air-dry to hard, highly adherent films having excellent chemical resistance to alkali, acid, water, and certain organic solvents. Other objects will become apparent.

In the present invention, I have found that I can prepare air-drying copolymers, films of which also exhibit the hardness and chemical resistance required of a useful surface coating material. More specifically, I have discovered that I can produce an apparently modified and novel reaction product having the aforesaid desirable characteristics by copolymerizing the less costly conjugated soybean vinyl ether and a lower alkyl vinyl ether under carefully controlled partially restrained conditions. The term "partially restrained" is intended to distinguish our polymerization conditions from the uncontrolled spontaneous and very rapid reaction known as a flash polymerization, and involves slowly polymerizing the specific monomers at a carefully controlled temperature not exceeding the critical value of 25–30° C. which is achieved by conducting the reaction in about 3 to 4 volumes of an inactive hydrocarbon solvent such as toluene or cyclohexane in contact with a controllable cooling means such as a water jacket, the polymerization being initiated and maintained substantially at room temperature; also by the slow dropwise addition of a dilute solution of stannic chloride in toluene during the course of about the first 15 minutes. The polymerization is permitted to continue for another 15 minutes and is then terminated by inactivating or quenching the catalyst with absolute methanol. The catalyst is then complexed in known manner by adding an alkaline earth metal such as calcium hydroxide and removed by filtration.

The copolymer solution, comprising approximately 10–25 percent of the copolymer, can be directly used to cast films which dry overnight. If desired, a conventional drying catalyst such as zinc naphthenate can be added to the extent of 0.05–0.2 percent of the polymer solution. Baked films can be obtained by baking at 200° C. for 10 minutes or at 150° C. for 1 hour.

In Table I results obtained in the restrained polymerization are compared with those obtained by flash polymerization.

TABLE I

| Flash polymerized | Restrained polymerization |
|---|---|
| Conj. soybean vinyl ether—50 g. | 50 g. |
| Vinyl isobutyl ether—52 g. | 52 g. |
| Anhydrous toluene diluent—265 g. | 265 g. |
| Catalyst—8 ml. of 8% $SnCl_4$ in toluene. | 8 ml. of 2% $SnCl_4$ in toluene (added dropwise). |
| Polymerization temp.—20° C., rose to 80° C. | 25° C. |
| Viscosity of mixt. after polymerization (Ostwald at 25° C.)—11 cps. | 43 cps. |
| Air-dried film (Sward hardness units)—tacky. | 10. |
| Resistance to 5% NaOH—tacky. | Unaffected at 24–36 hrs. |

The following embodiment will further teach the practice of my invention.

Example 1

To a mixture of 50 parts of purified conjugated soybean vinyl ether, 52 parts of vinyl isobutyl ether, and 265 parts of dried toluene were added dropwise with stirring 7 parts of a 2-percent stannic chloride solution in toluene. Temperature of the solution was controlled at 25° C. by water cooling. When all of the catalyst had been added, stirring was continued until a total reaction period of ½ hour had been completed. The catalyst was deactivated with 40 parts of absolute methanol. To precipitate the catalyst from the clear solution, 2 parts of hydrated lime and 5 parts of water were added and the mixture agitated for approximately 1 hour. The catalyst was then separated by filtering.

Example 2

To a mixture of 52 parts of conjugated linseed vinyl ether and 52 parts of vinyl isobutyl ether in 265 parts of dried toluene were added 7 parts of a 2-percent stannic chloride solution in toluene as in Example 1, and the polymerization was conducted under the same conditions. Films of the obtained polymer air-dried overnight.

Having disclosed my invention, I claim:
1. A method of producing a copolymer comprising copolymerizing a monomeric conjugated soybean vinyl ether and monomeric isobutyl vinyl ether in an inactive hydrocarbon solvent in the presence of stannic chloride as a polymerization catalyst, at a temperature of 25° to 30° C. to produce a solution of copolymer having a molecular weight of about 5,000 to 10,000.

2. A method of producing a copolymer comprising copolymerizing about 1 part of a monomeric conjugated soybean vinyl ether and 1 part of monomeric isobutyl vinyl ether, in an inactive hydrocarbon solvent from the group consisting of toluene and cyclohexane, slowly adding a dilute solution of stannic chloride as a polymerization catalyst while cooling to maintain the solution at a temperature of about from 25° to 30° C., adding methanol to inactivate the catalyst, to produce a solution of copolymer having a molecular weight of about 5,000 to 10,000, adding aqueous calcium hydroxide to complex the catalyst, and filtering to remove the catalyst complex from the copolymer solution.

References Cited in the file of this patent

Teeter et al.: Paint Industry Magazine, vol. 74 (1959), pp. 13–17.